United States Patent
Hung

(10) Patent No.: US 9,143,549 B2
(45) Date of Patent: Sep. 22, 2015

(54) COMMUNICATION SYSTEM OFFERING REMOTE ACCESS AND COMMUNICATION METHOD THEREOF

(71) Applicant: Jeng-Hung Hung, Taipei (TW)

(72) Inventor: Jeng-Hung Hung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 421 days.

(21) Appl. No.: 13/658,835

(22) Filed: Oct. 24, 2012

(65) Prior Publication Data

US 2013/0132575 A1    May 23, 2013

(30) Foreign Application Priority Data

Nov. 21, 2011    (TW) .................. 10142531 A

(51) Int. Cl.
*G06F 15/16* (2006.01)
*H04L 29/08* (2006.01)
*H04L 29/06* (2006.01)

(52) U.S. Cl.
CPC .............. *H04L 67/02* (2013.01); *H04L 29/06* (2013.01); *H04L 29/08072* (2013.01); *H04L 67/141* (2013.01)

(58) Field of Classification Search
CPC .................... H04L 29/06; H04L 29/08072
USPC .................... 709/218, 220, 228, 230
See application file for complete search history.

(56) References Cited

U.S. PATENT DOCUMENTS

| | | | |
|---|---|---|---|
| 6,741,968 B2 | 5/2004 | Jacoves et al. | |
| 6,892,301 B1 | 5/2005 | Hansmann et al. | |
| 7,711,788 B2 | 5/2010 | Lev Ran et al. | |
| 7,975,291 B2* | 7/2011 | Amamiya et al. | 726/6 |
| 2005/0028012 A1* | 2/2005 | Amamiya et al. | 713/201 |
| 2005/0177577 A1 | 8/2005 | Asokan et al. | |
| 2007/0168046 A1 | 7/2007 | Misawa et al. | |
| 2009/0019367 A1* | 1/2009 | Cavagnari et al. | 715/716 |
| 2009/0240785 A1* | 9/2009 | Kikkawa | 709/218 |
| 2010/0124228 A1 | 5/2010 | Tinnakornsrisuphap et al. | |
| 2013/0304932 A1* | 11/2013 | Kruse et al. | 709/230 |

FOREIGN PATENT DOCUMENTS

| | | |
|---|---|---|
| CN | 101848225 | 9/2010 |
| TW | 449991 | 8/2001 |
| TW | 200726132 | 7/2007 |
| TW | 200835262 | 8/2008 |
| TW | 201032664 | 9/2010 |

* cited by examiner

*Primary Examiner* — Khanh Dinh
(74) *Attorney, Agent, or Firm* — Jianq Chyun IP Office

(57) ABSTRACT

A communication system offering remote access and a communication method thereof are provided. The communication system includes a remote device, a relay node, and at least one server device. The relay node controls a connection from the remote device to a local area network (LAN). The at least one server device is located in the LAN. The remote device communicates with the relay node by using a web access protocol. The relay node converts a first command compliant with the web access protocol into a second command compliant with a LAN data access protocol, so that the remote device can remotely access the at least one server device through the relay node. Thereby, the remote device can remotely access the at least one server device without setting parameters of related network nodes.

17 Claims, 4 Drawing Sheets

COMMUNICATION SYSTEM OFFERING REMOTE ACCESS AND COMMUNICATION METHOD THEREOF

CROSS-REFERENCE TO RELATED APPLICATION

This application claims the priority benefit of Taiwan application serial no. 100142531, filed on Nov. 21, 2011. The entirety of the above-mentioned patent application is hereby incorporated by reference herein and made a part of this specification.

BACKGROUND OF THE INVENTION

1. Field of the Invention

The invention generally relates to a communication technique, and more particularly, to a communication system offering remote access and a communication method thereof.

2. Description of Related Art

Each local area network (LAN) has corresponding relay nodes (for example, gateways, routers, or switches). These relay nodes take care of network address allocation and translation between the intranet (LAN) and the extranet (the Internet) and monitor, block, and filter network packets transmitted from the extranet to the intranet to protect communication devices located in the LAN.

However, when a user travels to another place and wants to remotely access files or multimedia resources on the LAN deployed at the user's home or company, the LAN monitoring mechanism implemented on the relay nodes usually does not allow any connection from the extranet to the intranet. Various remote access techniques have been developed so far to resolve the problem mentioned above. However, to implement such a technique, a user has to set parameters of related network nodes on the relay nodes. In other words, the implementation of each of aforementioned techniques requires very complicated operations for users.

SUMMARY OF THE INVENTION

Accordingly, the invention is directed to a communication system offering remote access and a communication method thereof, in which a web access protocol supported by many browsers and a local area network (LAN) data access protocol supported by many operating systems are integrated so that a remote device can remotely access server devices in a LAN without setting parameters of related network nodes.

The invention provides a communication system offering remote access. The communication system includes a remote device, a relay node, and at least one server device. The relay node controls a connection from the remote device to a LAN. The at least one server device is located in the LAN. The remote device communicates with the relay node by using a web access protocol. The relay node converts a first command compliant with the web access protocol into a second command compliant with a LAN data access protocol, so that the remote device can remotely access the at least one server device through the relay node.

According to an embodiment of the invention, the remote device and the relay node are both coupled to an internet. The remote device communicates with the relay node through the internet. The relay node controls connections from the internet to the LAN.

According to an embodiment of the invention, the web access protocol may be a web-based distributed authoring and versioning (WebDAV) protocol based on the hypertext transfer protocol (HTTP), and the LAN data access protocol may be a server message block (SMB) protocol.

According to an embodiment of the invention, the remote device and the server device perform an authentication procedure, a directory acquisition procedure, and/or a file acquisition procedure through the relay node.

The invention provides a communication method offering remote access. The communication method is adapted to a relay node of a communication system, wherein the relay node controls the connection from an internet to a LAN. The communication method includes following steps. A first command compliant with a web access protocol is received from a remote device in the internet. The first command is converted into a second command compliant with a LAN data access protocol. The second command is transmitted to at least one server device in the LAN, so that the remote device can remotely access the server device through the relay node.

Other implementation details of the communication method offering remote access provided by an embodiment of the invention can be referred to foregoing descriptions and will not be described herein.

As described above, in a communication system and a communication method thereof provided by embodiments of the invention, a web access protocol (for example, the WebDAV protocol) supported by many browsers and a LAN data access protocol (for example, the SMB protocol) supported by many operating systems are integrated. Thus, a user needs not to set network parameters of related network nodes (for example, clients, servers, and relay nodes) and can remotely access servers (for example, perform identity authentication and data access) in a LAN through a relay node (for example, a gateway) by simply connecting to the relay node.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
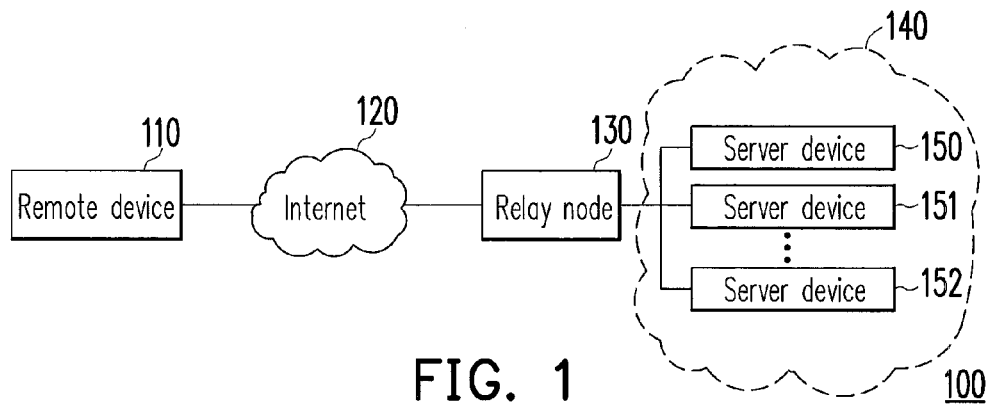
FIG. 1 is a diagram of a communication system offering remote access according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a communication system 100 offering remote access according to a first embodiment of the invention. The communication system 100 includes a remote device 110, a relay node 130, and server devices 150-152 located in a local area network (LAN) 140. The remote device 110 may be a smart phone, a handheld computer, a desktop computer carried or used by a user or any communication device that can connect to the Internet 120. The server devices 150-152 constitute the LAN 140. All the server devices 150-152 are connected to the relay node 130, and each of the server devices 150-152 is connected to the Internet 120 through the relay node 130. The server devices 150-152 may be home computers in a residential LAN, computers in a commercial LAN, or network attached storage (NAS) devices.

The remote device 110 can be directly connected to the Internet 120. Thus, when needed, a user can connect to the Internet 120 through the remote device 110 and then communicate with the relay node 130 through the Internet 120. Herein the relay node 130 is configured to control connections from the Internet 120 to the LAN 140 and the server devices 150-152. For example, the relay node 130 monitors all network packets entering the LAN 140 from the Internet 120, filters the source addresses/target addresses of these network packets, and blocks those network packets that are unidentifiable or do not belong to the LAN 140, so as to protect communication devices located in the LAN.

In the present embodiment, the relay node 130 is described as a gateway. However, the invention is not limited thereto, and the relay node 130 may also be another type of network connection equipment, such as a router or a switch. The network connection equipment is configured to control all connections to the LAN 140 through the Internet 120.

Referring to FIG. 1, when the user is about to access or share remote files/multimedia resources through the Internet 120 by using the remote device 110, the user sets up the server devices 150-152 in the LAN 140 and configures the relay node 130 (i.e., a gateway) in the user's home or company to allow the remote device 110 to successfully connect with the server devices 150-152.

However, most users are not familiar with the setting of network parameters. For example, when a user sets up the server devices 150-152 or configures a corresponding application program in the remote device 110, the user may mix up the network parameters to be configured (for example, subnet masks, network addresses, and related ports of the remote device 110 and the server devices 150-152). Or, the user may not understand the functions to be set up on the relay node 130.

On the other hand, the server message block (SMB) protocol is the simplest data access protocol which does not require many network parameters to be set and is supported by most manufacturers. The SMB protocol is also referred to as a common internet file system (CIFS), and which allows communication devices in a LAN to know about the existence of each other and accordingly share files, multimedia resources, printers, serial ports, and communication resources through packet broadcasting.

The SMB protocol is supported by the publishers of many operating systems, such as the UNIX operating system and the Windows operating system published by the Microsoft Corporation. Particularly, most functions, such as the "Workgroup" and the "Network Neighborhood", in the Windows operating system are implemented based on the SMB protocol. However, the function of any LAN data access protocol implemented through packet broadcasting, such as the SMB protocol, is limited to resource sharing among the communication devices in the LAN 140. When a communication device is out of the range of the LAN 140 or the network address thereof belongs to a different subnet, the communication device cannot remotely access data in the LAN 140 by using the SMB protocol.

The relay node 130 in the invention can integrate a web access protocol (for example, the web-based distributed authoring and versioning (WebDAV) protocol) supported by many browsers and a LAN data access protocol (for example, the SMB protocol) to realize the communication system offering remote access and the communication method thereof in the present embodiment, so that a user can access files and multimedia resources in a LAN deployed at the user's home or company through a simply user interface.

In other words, the remote device 110 communicates with the relay node 130 by using a web access protocol supported by many browsers. Once the relay node 130 receives a remote access request from the remote device 110, it scans the server devices 150-152 in the LAN to allow the remote device 110 to select one of the server devices 150-152. Besides, the relay node 130 converts commands that are issued by the remote device 110 and comply with a web access protocol into commands compliant with a LAN data access protocol, so that the remote device 110 can remotely access the server devices 150-152 through the relay node 130.

In the present embodiment, the web access protocol adopted between the remote device 110 and the relay node 130 is assumed to be the WebDAV protocol. The WebDAV protocol is based on the hypertext transfer protocol (HTTP), and which allows files to be edited and managed on network servers so that those websites compliant with the WebDAV protocol become media for reading and writing. The relay node in the present embodiment of the invention converts between commands compliant with the WebDAV and commands compliant with the SMB protocol, so as to realize the technique provided by the present embodiment.

Figure 2A:
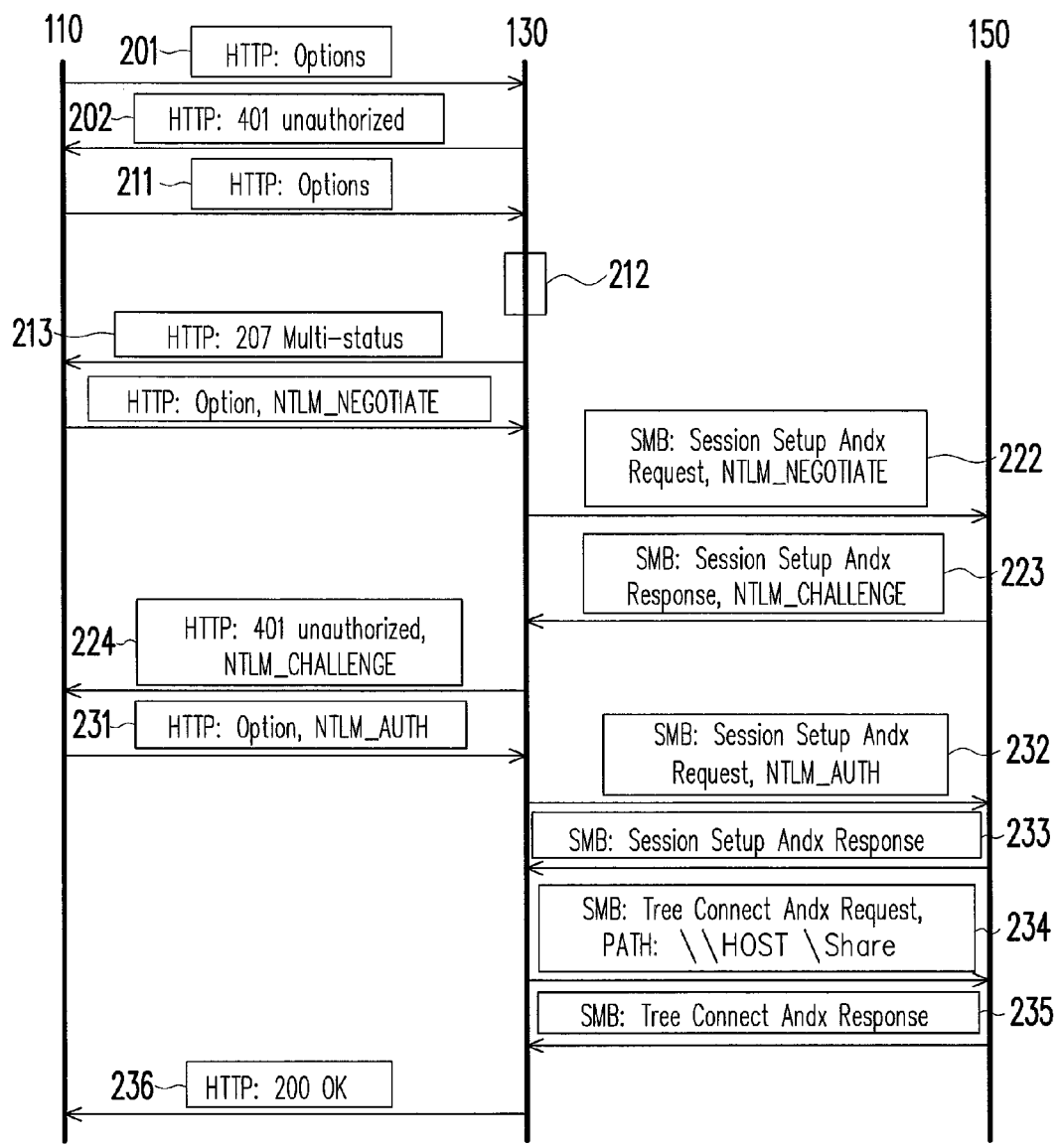
FIG. 2A and FIG. 2B are respectively flowcharts of an identity authentication procedure based on two authentication mechanisms according to the first embodiment of the invention.
Figure 2B:
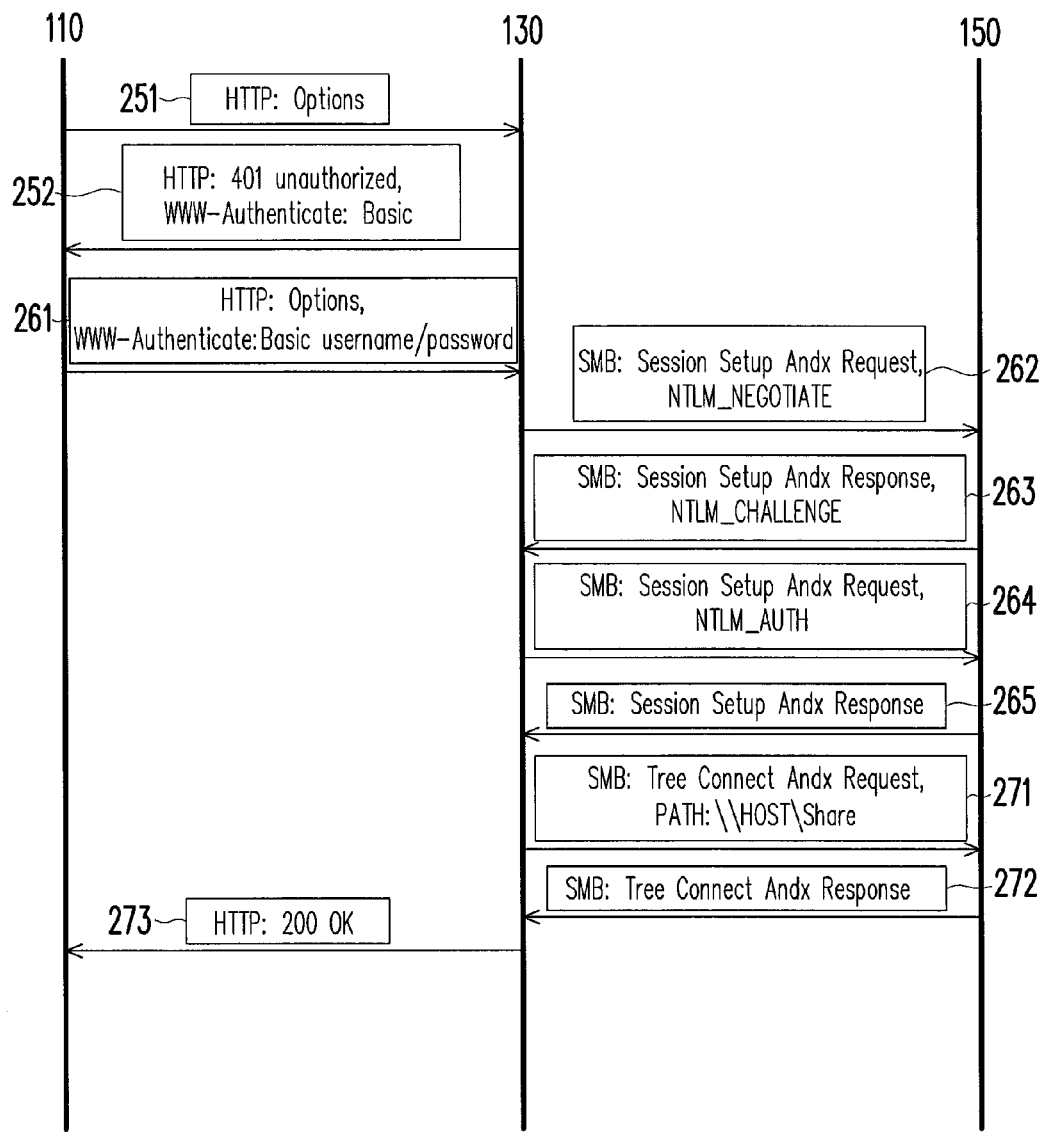

In the present embodiment, the remote device 110 and the server devices 150-152 of the communication system 100 carry out an identity authentication procedure, a directory acquisition procedure, and a file acquisition procedure, so as to accomplish remote access, through the relay node 130. Below, aforementioned procedures will be explained one by one with examples. FIG. 2A and FIG. 2B are respectively flowcharts of an identity authentication procedure based on two authentication mechanisms according to the first embodiment of the invention. In the present embodiment, the identity authentication procedure and related procedures in a communication method offering remote access are explained with reference to FIG. 2A and FIG. 2B. For the convenience of description, below, commands in an actual implementation of the present embodiment will be denoted with the symbols "[ ]" to be referred by those implementing the present embodiment. However, the invention is not limited thereto.

The present embodiment provides two authentication mechanisms for the server devices 150-152 as examples. There are two types of authentication mechanisms. One is the New Technology LAN Manager (NTLM) authentication of the Windows system provided by the Microsoft Corporation, and the other one is the basic access authentication (referred to as the basic authentication thereinafter) in the HTTP protocol. Below, an example of the NTLM authentication will be described with reference to FIG. 2A, and an example of the basic authentication will be described with reference to FIG. 2B. However, those skilled in the art should understand that many different types of authentication mechanisms are applicable to the present embodiment. Thus, the type of the authentication mechanism is not limited in the invention.

Referring to both FIG. 1 and FIG. 2A, when the remote device 110 is about to access data remotely through the relay node 130, it transmits a remote access option [HTTP: Options] compliant with the WebDAV protocol to the relay node 130 through the Internet 120 (step 201). In the present embodiment, the user's remote device 110 can transmit a command (for example, the remote access option) to the relay node 130 by using the network address or domain name of the relay node 130 through a browser in the remote device 110.

The relay node 130 receives the remote access option compliant with the WebDAV protocol from the remote device 110 (step 201). If the relay node 130 comes with an authentication mechanism, it parses the remote access option and determines whether the remote access option contains authentication information of the relay node 130. Herein the "authentication information of the relay node 130" may be the ID and password of a user for logging into the relay node 130. If the remote access option does not contain the authentication information of the relay node 130 or the authentication information is erroneous, the user is not authorized for remote access through the relay node 130. Thus, the relay node 130 transmits a relay node authentication error [HTTP: 401 unauthorized] to the remote device 110 (step 202).

Additionally, in the present embodiment, the remote device 110 can transmit a remote access option [HTTP: Options] already containing the authentication information of the relay node 130 to the relay node 130 (step 211). After parsing the remote access option and determining that the remote access option contains correct authentication information of the relay node 130, the relay node 130 sequentially scans the server devices 150-152 in the LAN 140 to establish a server list (step 212). Besides, the relay node 130 transmits the server list to the remote device 110 through an extended function command [HTTP: 207 Multi-status] (step 213).

It should be noted that the relay node 130 can place the server list into the extended function command to transmit it to the remote device 110 or set up an additional data transmission channel with the remote device 110 to transmit the server list. Thus, the user can select one of the server devices 150-152 according to the server list and perform remote data access through the relay node 130. It should be understood by those skilled in the art that the relay node 130 can establish the server list (step 212) through many different techniques and these techniques will not be described herein.

In the present embodiment, it is assumed that the user selects the server device 150 as a specific server device and is about to access data in the server device 150. Herein the remote device 110 needs to pass the identity authentication of the server device 150 according to the NTLM authentication mechanism.

With the NTLM authentication mechanism, the remote device 110 transmits a server access option [HTTP: Options, NTLM_NEGOTIATE] containing related information of the server device 150 to the relay node 130 (step 221). The relay node 130 receives the server access option from the remote device 110 and determines whether the server access option contains correct authentication information of the relay node 130. After that, the relay node 130 converts the server access option into a session setup request [SMB: Session Setup Andx Request, NTLM_NEGOTIATE] compliant with a LAN data access protocol (for example, the SMB protocol) and transmits the session setup request to the server device 150 selected by the user (step 222).

If the server device 150 comes with the NTLM authentication mechanism, it parses the session setup request and determines whether the session setup request carries authentication information of the server device 150. If the session setup request in step 222 does not carry the authentication information of the server device 150 or the authentication information is erroneous (i.e., the user is not authorized to remotely access the server device 150), the server device 150 transmits a session setup error [SMB: Session Setup Andx Response, NTLM_CHALLENGE] to the relay node 130 (step 223). Once the relay node 130 receives the session setup error from the server device 150, it transmits a server authentication error [HTTP: 401 unauthorized, NTLM_CHALLENGE] to the remote device 110 (step 224).

Herein the user may also transmit a server access option [HTTP: Options, NTLM_AUTH] containing authentication information of the relay node 130 and the server device 150 to the relay node 130 through the remote device 110 (step 231). After the relay node 130 receives the server access option and validates the authentication, it converts the server access option in step 231 into a session setup request [SMB: Session Setup Andx Request, NTLM_AUTH] compliant with the SMB protocol and transmits the session setup request to the server device 150 (step 232).

After the server device 150 validates the session setup request in step 232, it transmits a session setup response [SMB: Session Setup Andx Response] to the relay node 130 (step 233) to ensure that the session between the server device 150 and the relay node 130 is established. After the relay node 130 receives the session setup response (step 233), it instantly transmits a tree connect request [SMB: Tree Connect Andx Request, PATH: \\HOST\Share] to the server device 150 to request the server device 150 to provide the file directory of a shared folder (step 234). In the present embodiment, the shared folder of the server device 150 may be a folder specified by the path "\\HOST\Share".

Thereafter, the relay node 130 receives a tree connect response [SMB: Tree Connect Andx Response] from the server device 150 (step 235). Besides, the relay node 130 converts the tree connect response into a server authentication acknowledgement [HTTP: 200 OK] and transmits the server authentication acknowledgement to the remote device 110 (step 236). Herein both the tree connect response and the server authentication acknowledgement carry the file directory of the shared folder in the server device 150.

How an identity authentication procedure is performed based on the basic authentication mechanism will be explained below with reference to FIG. 1 and FIG. 2B, and part of the implementation has been described in foregoing embodiment therefore will not be described herein. Referring to both FIG. 1 and FIG. 2B, with the basic authentication mechanism, when the remote device 110 is about to perform remote data access through the relay node 130, it transmits a remote access option [HTTP: Options] compliant with the WebDAV protocol to the relay node 130 through the Internet 120 (step 251).

The relay node 130 receives the remote access option compliant with the WebDAV protocol from the remote device 110 (step 251). Besides, because the relay node 130 in the present embodiment comes with the basic authentication mechanism, it parses the remote access option and determines whether the server access option contains authentication information of the relay node 130 in the HTTP format. If the server access option does not contain the authentication information of the relay node 130 or the authentication information is erroneous (i.e., the user is not authorized to perform remote data access through the relay node 130), the relay node 130 transmits a relay node authentication error [HTTP: 401 unauthorized, WWW-Authenticate: Basic] to the remote device 110 (step 252). Besides, in this step, the authentication mechanism adopted by the relay node 130 (i.e., the basic authentication mechanism) is also transmitted to the remote device 110 to let the remote device 110 know.

Thereafter, the remote device 110 transmits a server access option [HTTP: Options, WWW-Authenticate: Basic username/password] containing authentication information related to the server device 150 to the relay node 130 (step 261). After receiving the server access option from the remote device 110, the relay node 130 obtains corresponding authentication information (i.e., a username and a password) from the server access option and converts the server access option into a session setup request [SMB: Session Setup Andx Request, NTLM_NEGOTIATE] compliant with a LAN data access protocol (for example, the SMB protocol). Besides, the relay node 130 transmits the session setup request to the server device 150 selected by the user (step 262).

The server device 150 parses the session setup request according to the basic authentication mechanism and determines whether the session setup request carries the authentication information of the server device 150. Herein because the basic authentication mechanism does not use the authentication information directly to authenticate, the server device 150 transmits a session setup error [SMB: Session Setup Andx Response, NTLM_CHALLENGE] to the relay node 130 (step 263), and herein the session setup error carries a challenge value.

Once the relay node 130 receives the session setup error from the server device 150, it obtains the challenge value from the session setup error and performs a special calculation on the challenge value and the previously obtained username/password to obtain an encrypted authentication value. After that, the relay node 130 embeds the encrypted authentication value into a session setup request [SMB: Session Setup Andx Request, NTLM_AUTH] compliant with the SMB protocol and then transmits the session setup request containing the encrypted authentication value to the server device 150 (step 264).

The server device 150 authenticates by using the username/password and the encrypted authentication value to enhance the security of identity authentication. After the server device 150 validates the session setup request in step 264, it transmits a session setup response [SMB: Session Setup Andx Response] to the relay node 130 (step 265) to declare that a session between the server device 150 and the relay node 130 has been established.

Once receiving the session setup response (step 265), the relay node 130 instantly transmits a tree connect request [SMB: Tree Connect Andx Request, PATH:\\HOST\Share] to the server device 150 (step 271) to request the server device 150 to provide a file directory of a shared folder thereof. In the present embodiment, the shared folder of the server device 150 may be a folder specified by the path "\\HOST\Share".

The relay node 130 receives the tree connect response [SMB: Tree Connect Andx Response] (step 272) from the server device 150. Besides, the relay node 130 converts the tree connect response into a server authentication acknowledgement [HTTP: 200 OK] and transmits the server authentication acknowledgement to the remote device 110 (step 273). Herein both the tree connect response and the server authentication acknowledgement contain the file directory of the shared folder in the server device 150. Thereby, the communication system 100 allows the remote device 110 to pass identity authentication of the server device 150 smoothly and obtain the file directory of the shared folder in the server device 150 through the relay node 130.

Figure 3:
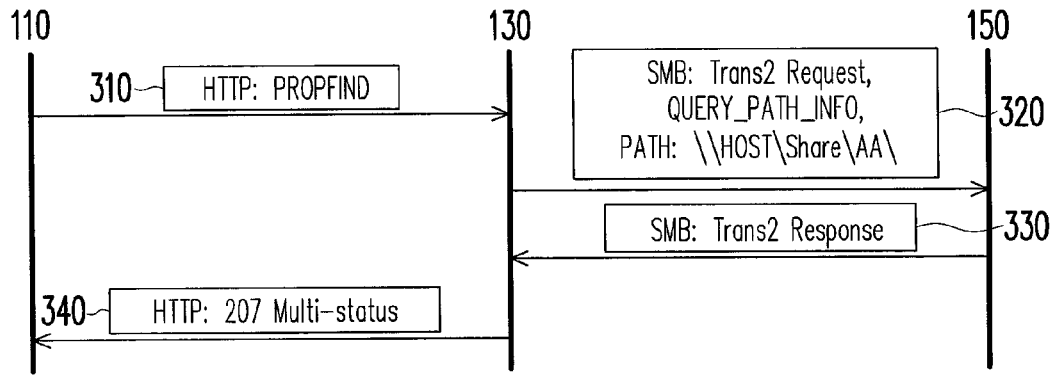
FIG. 3 is a flowchart of a directory acquisition procedure according to the first embodiment of the invention.

FIG. 3 is a flowchart of a directory acquisition procedure according to the first embodiment of the invention. In the present embodiment, the directory acquisition procedure in the communication system 100 offering remote access will be described with reference to FIG. 3. Referring to both FIG. 1 and FIG. 3, after the remote device 110 passes the authentication of the relay node 130 and the server device 150 and receives the file directory of the shared folder in the server device 150, the user is about to open a specific folder in the shared folder and obtain a file directory of the specific folder. Herein it is assumed that the specific folder is a folder specified by the path "\\HOST\Share\AA\".

Thus, the remote device 110 transmits a directory provision option[HTTP: PROPFIND] compliant with the WebDAV protocol (step 310). Herein the directory provision option contains related information of the path of the specific folder. When the relay node 130 receives the directory provision option from the remote device 110 (step 310), it converts the directory provision option compliant with the WebDAV protocol into a path index request [SMB: Trans2 Request, QUERY_PATH_INFO, PATH:\\HOST\Share\AA\] compliant with the SMB protocol and transmits the path index request to the server device 150 (step 320).

Thereafter, the relay node 130 receives a path index response [SMB: Trans2 Response] from the server device 150 (step 330). Herein the path index response carries the file directory of the specific folder. Besides, the relay node 130 converts the path index response into a directory provision acknowledgement [HTTP: 207 Multi-status] and transmits the directory provision acknowledgement to the remote device 110 (step 340). It should be noted that the directory provision acknowledgement also carries the file directory of the specific folder. In the present embodiment, the directory provision acknowledgement is implemented as an extended function command [207 Multi-status] so that the relay node 130 can transmit the file directory of the specific folder to the remote device 110 through the extended function command.

Figure 4:
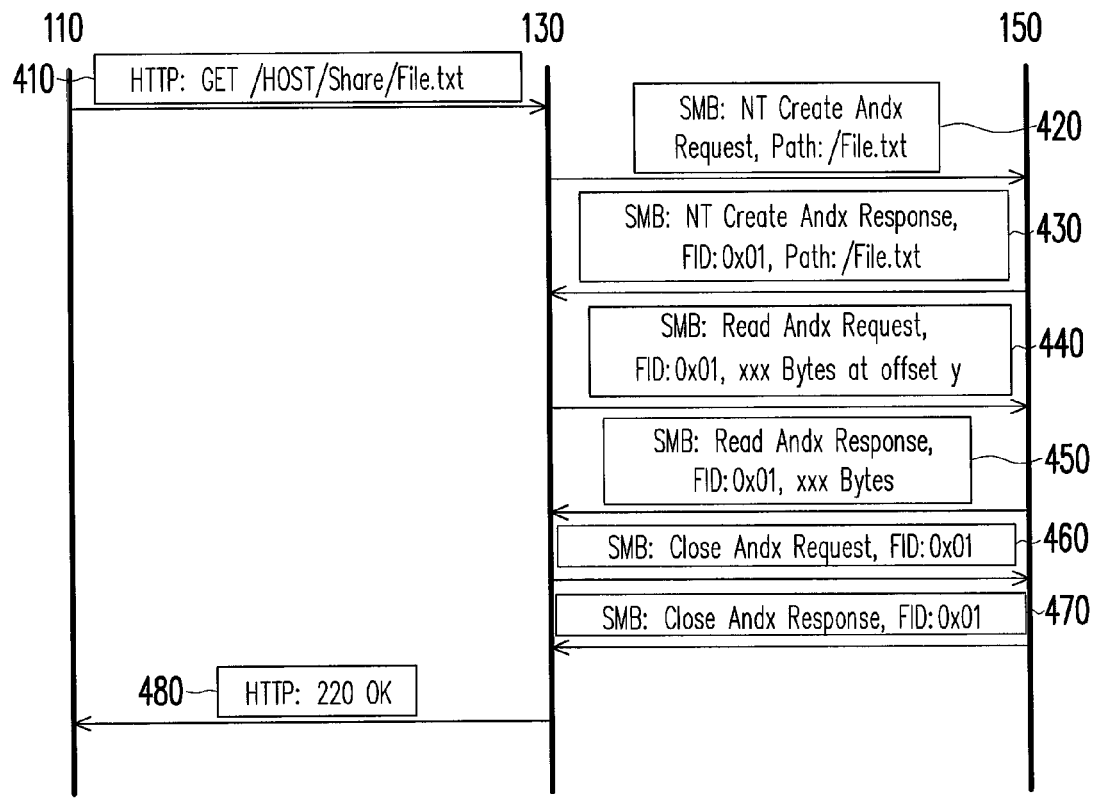
FIG. 4 is a flowchart of a file acquisition procedure according to the first embodiment of the invention.

FIG. 4 is a flowchart of a file acquisition procedure according to the first embodiment of the invention. In the present embodiment, a file acquisition procedure in the communication system 100 offering remote access will be described with reference to FIG. 1 and FIG. 4. Herein it is assumed that a specific file may be a file specified by the path "\\HOST\Share\File.txt" in the server device 150. Referring to both FIG. 1 and FIG. 4, when the remote device 110 is about to obtain a specific file from the server device 150, the remote device 110 transmits a file acquiring option [HTTP: GET/HOST/Share/File.txt] to the relay node 130 (step 410). Once receiving the file acquiring option, the relay node 130 converts the file acquiring option compliant with the WebDAV protocol into a file opening request [SMB: NT Create Andx Request, Path:/File.txt] compliant with the SMB protocol and transmits the file opening request to the server device 150 (step 420).

Once the relay node 130 receives a file opening response [SMB: NT Create Andx Response, FID:0x01, Path:/File.txt] from the server device 150 (step 430), the relay node 130 transmits a file transmission request [SMB: Read Andx Request, FID:0x01, xxx Bytes at offset y] to the server device 150 (step 440). When the relay node 130 receives the file transmission response [SMB: Read Andx Response, FID: 0x01, xxx Bytes] from the server device 150 (step 450), it starts to receive the specific file from the server device 150. In the present embodiment, the relay node 130 and the server device 150 set up a corresponding file transmission channel through aforementioned commands. Meanwhile, the relay node 130 and the remote device 110 also set up a corresponding file transmission channel. Thus, the specific file can be smoothly transmitted from the server device 150 to the remote device 110 via the relay node 130.

After receiving the specific file, the relay node 130 transmits a file closing request [SMB: Close Andx Request, FID: 0x01] to the server device 150 (step 460). Then, the relay node 130 receives a file closing response [SMB: Close Andx Response, FID:0x01] from the server device 150 (step 470). After that, the relay node 130 converts the file closing response into a web file acknowledgement [HTTP: 220 OK] and transmits the web file acknowledgement to the remote device 110 (step 480) to complete the remote access of the specific file.

Figure 5:
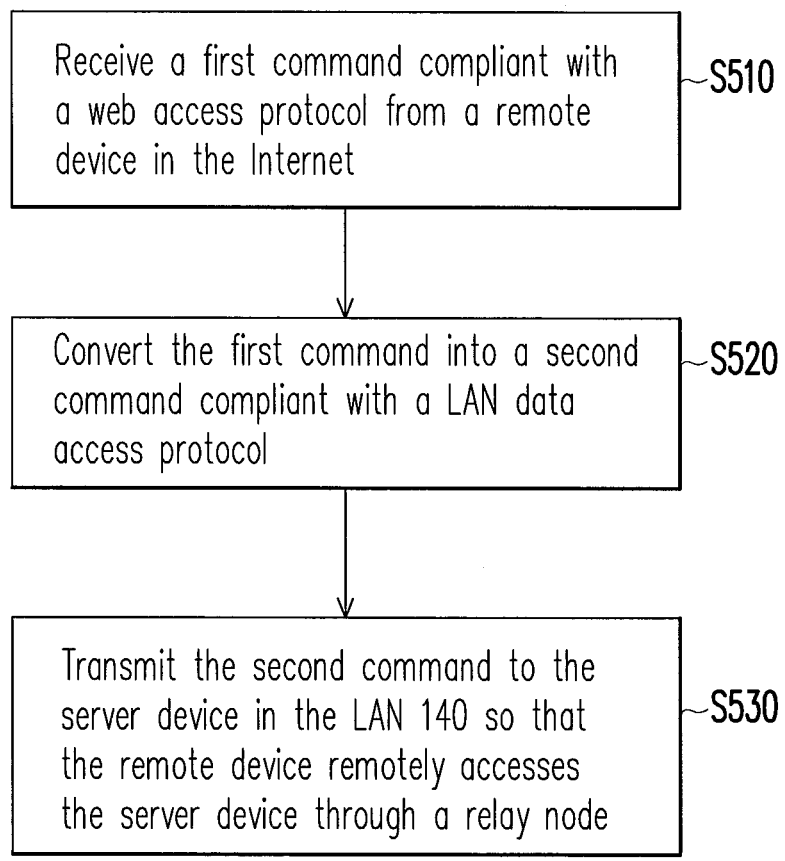
FIG. 5 is a flowchart of a communication method offering remote access according to the first embodiment of the invention.

Related operation flows of the communication system 100 can be summarized into the procedure in FIG. 5. FIG. 5 is a flowchart of a communication method offering remote access according to the first embodiment of the invention. This communication method is adapted to the relay node 130 in the communication system 100 in FIG. 1. Referring to both FIG. 1 and FIG. 5, in step S510, the relay node 130 receives a first command compliant with a web access protocol from the remote device 110 in the Internet 120. In step S520, the relay node 130 converts the first command into a second command compliant with a LAN data access protocol. In step S530, the relay node 130 transmits the second command to the server devices 150-152 in the LAN 140, so that the remote device 110 can remotely access the server devices 150-152 through the relay node 130. Part of the implementation of the present embodiment has been described in foregoing embodiment therefore will not be described herein.

Unlike that in the conventional technique, the relay node 130 needs not to mount the shared folders in the server devices 150-152 on its own initiative. The remote device 110 remotely accesses the server devices 150-152 through the relay node 130 according to the SMB protocol. Thus, the relay node 130 scans all the server devices in the LAN 140 and provides the obtained server list to the user only when the remote device 110 is about to perform remote access. In the communication system 100, dual authentication mechanisms may be deployed in the relay node 130 and the server devices 150-152 to enhance the security of shared resources.

Moreover, with the support of many operating systems, when a user sets up the server devices 150-152, the user simply configures the shared folders in these server devices 150-152. A user at another place can remotely but conveniently access data through a browser in the remote device 110. Thus, the procedure for setting up remote access is greatly simplified and no complicated network parameter needs to be configured.

As described above, in the communication system 100 and the communication method thereof provided by embodiments of the invention, a web access protocol (for example, the WebDAV protocol) supported by many browsers and a LAN data access protocol (for example, the SMB protocol) supported by many operating systems are integrated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A communication system offering remote access, comprising:
a remote device;
a relay node, controlling a connection from the remote device to a local area network (LAN); and
at least one server device, located in the LAN;
wherein the remote device communicates with the relay node by using a web access protocol, and the relay node converts a first command compliant with the web access protocol into a second command compliant with a LAN data access protocol, so as to allow the remote device to remotely access the at least one server device through the relay node,
wherein the relay node receives a server access option from the remote device, converts the server access option into a session setup request compliant with the LAN data access protocol, and transmits the session setup request to a specific server device corresponding to the server access option, wherein the specific server device is one of the at least server device,
wherein the relay node receives a session setup response and transmits a tree connect request to the specific server device to request to receive a file directory, the relay node receives a tree connect response and converts the tree connect response into a server authentication acknowledgement, wherein the tree connect response comprises the file directory, and the relay node transmits the server authentication acknowledgement to the remote device.

2. The communication system according to claim 1, wherein the remote device and the relay node are coupled to an internet, the remote device communicates with the relay node through the internet, and the relay node controls a connection from the internet to the LAN.

3. The communication system according to claim 1, wherein the relay node receives a remote access option compliant with the web access protocol from the remote device, sequentially scans the at least one server device in the LAN to establish a server list, and transmits the server list to the remote device.

4. The communication system according to claim 1, wherein the web access protocol is a web-based distributed authoring and versioning (WebDAV) protocol.

5. The communication system according to claim 1, wherein the LAN data access protocol is a server message block (SMB) protocol.

6. The communication system according to claim 1, wherein the remote device communicates with the relay node by using the web access protocol and a network address of the relay node.

7. The communication system according to claim 1, wherein the remote device and the at least one server device perform an authentication procedure, a directory acquisition procedure, and/or a file acquisition procedure through the relay node.

8. The communication system according to claim 1, wherein the relay node is a gateway, a router, or a switch.

9. A communication method offering remote access, adapted to a relay node, wherein the relay node controls a connection from an internet to a LAN, the communication method comprising:
receiving a first command compliant with a web access protocol from a remote device in the internet;
converting the first command into a second command compliant with a LAN data access protocol; and
transmitting the second command to at least one server device in the LAN to allow the remote device to remotely access the at least one server device through the relay nod;
wherein the step of remotely accessing the at least one server device by using the remote device through the relay node includes:

receiving a server access option from the remote device;
converting the server access option into a session setup request compliant with the LAN data access protocol;
transmitting the session setup request to a specific server device corresponding to the server access option, wherein the specific server device is one of the at least one server device;
receiving a session setup response, and transmitting a tree connect request to the specific server device to request to receive a file directory;
receiving a tree connect response and converting the tree connect response into a server authentication acknowledgement, wherein the tree connect response comprises the file directory; and
transmitting the server authentication acknowledgement to the remote device.

10. The communication method according to claim 9 further comprising:
receiving a remote access option compliant with the web access protocol from the remote device;
sequentially scanning the at least one server device in the LAN to establish a server list; and
transmitting the server list to the remote device.

11. The communication method according to claim 9, wherein the web access protocol is a WebDAV protocol.

12. The communication method according to claim 9, wherein the LAN data access protocol is a SMB protocol.

13. The communication method according to claim 9, wherein the step of remotely accessing the at least one server device by using the remote device through the relay node further comprises:
determining whether the server access option comprises a relay node authentication information; and
when the server access option does not comprise the relay node authentication information, transmitting a relay node authentication error to the remote device.

14. The communication method according to claim 9, wherein the step of remotely accessing the at least one server device by using the remote device through the relay node further comprises:
when a session setup error is received from the specific server device, transmitting a server authentication error to the remote device.

15. The communication method according to claim 9, wherein the step of remotely accessing the at least one server device by using the remote device through the relay node further comprises:
when a session setup error is received from the specific server device, obtaining a challenge from the session setup error, and performing a calculation on the challenge and a relay node authentication information to generate an encrypted authentication value; and
transmitting the session setup request comprising the encrypted authentication value to the remote device.

16. A communication method offering remote access, adapted to a relay node, wherein the relay node controls a connection from an internet to a LAN, the communication method comprising:
receiving a first command compliant with a web access protocol from a remote device in the internet;
converting the first command into a second command compliant with a LAN data access protocol; and
transmitting the second command to at least one server device in the LAN to allow the remote device to remotely access the at least one server device through the relay node,
wherein the step of remotely accessing the at least one server device by using the remote device through the relay node includes:
receiving a directory provision option from the remote device;
converting the directory provision option compliant with the web access protocol into a path index request compliant with the LAN data access protocol;
transmitting the path index request to a specific server device;
receiving a path index response and converting the path index response into a directory provision acknowledgement, wherein the path index response comprises a file directory; and
transmitting the directory provision acknowledgement to the remote device.

17. A communication method offering remote access, adapted to a relay node, wherein the relay node controls a connection from an internet to a LAN, the communication method comprising:
receiving a first command compliant with a web access protocol from a remote device in the internet;
converting the first command into a second command compliant with a LAN data access protocol; and
transmitting the second command to at least one server device in the LAN to allow the remote device to remotely access the at least one server device through the relay node,
wherein the step of remotely accessing the at least one server device by using the remote device through the relay node includes:
receiving a file acquiring option from the remote device;
converting the file acquiring option compliant with the web access protocol into a file opening request compliant with the LAN data access protocol, and transmitting the file opening request to a specific server device;
when a file opening response is received, transmitting a file transmission request to the specific server device;
receiving a file transmission response and receiving a file;
after the file is received, transmitting a file closing request to the specific server device;
receiving a file closing response; and
transmitting a web file acknowledgement to the remote device.

* * * * *